(12) United States Patent
Amato et al.

(10) Patent No.: US 8,907,774 B2
(45) Date of Patent: Dec. 9, 2014

(54) SYSTEM AND METHOD FOR MONITORING TIRE CONDITION

(75) Inventors: William P. Amato, Avon, OH (US); Timothy J. Frashure, Columbia Station, OH (US); Shawn D. Lammers, Delta (CA)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 660 days.

(21) Appl. No.: 13/037,786

(22) Filed: Mar. 1, 2011

(65) Prior Publication Data

US 2012/0223828 A1    Sep. 6, 2012

(51) Int. Cl.
*B60C 23/00* (2006.01)
*B60C 23/04* (2006.01)

(52) U.S. Cl.
CPC .................................. *B60C 23/0433* (2013.01)
USPC ..................... 340/447; 340/539.1; 340/425.5; 340/438; 340/442; 340/445

(58) Field of Classification Search
USPC ........... 340/447, 539.1, 425.5, 438, 442, 443, 340/444, 445
See application file for complete search history.

(56) References Cited

U.S. PATENT DOCUMENTS

| | | | |
|---|---|---|---|
| 3,780,373 A | 12/1973 | Holst et al. | |
| 4,328,494 A | 5/1982 | Goodall | |
| 5,231,872 A | 8/1993 | Bowler et al. | |
| 5,481,253 A | 1/1996 | Phelan et al. | |
| 5,606,732 A | 2/1997 | Vignone, Sr. | |
| 5,659,304 A | 8/1997 | Chakraborty | |
| 5,717,135 A | 2/1998 | Fiorletta et al. | |
| 5,839,534 A | 11/1998 | Chakraborty et al. | |
| 5,977,870 A | 11/1999 | Rensel et al. | |
| 6,034,597 A | 3/2000 | Normann et al. | |
| 6,055,855 A | 5/2000 | Straub | |
| 6,076,622 A | 6/2000 | Chakraborty et al. | |
| 6,087,930 A | 7/2000 | Kulka et al. | |
| 6,181,241 B1 | 1/2001 | Normann et al. | |
| 6,198,995 B1 | 3/2001 | Settles et al. | |
| 6,229,452 B1 | 5/2001 | Kull | |
| 6,232,875 B1 | 5/2001 | DeZorzi | |
| 6,289,332 B2 | 9/2001 | Menig et al. | |

(Continued)

FOREIGN PATENT DOCUMENTS

| | | |
|---|---|---|
| EP | 1714804 A2 | 10/2006 |
| WO | 0170520 A1 | 9/2001 |
| WO | 2005113261 A1 | 12/2005 |

OTHER PUBLICATIONS

Office Action from U.S. Appl. No. 12/697,873, dated Aug. 29, 2012.

(Continued)

*Primary Examiner* — Daryl Pope
(74) *Attorney, Agent, or Firm* — Eugene E. Clair; Cheryl L. Greenly; Brian E. Kondas

(57) ABSTRACT

An electronic device includes an antenna that receives RF signals from a sensor associated with a respective tire of the vehicle. The RF signals represent a condition of the respective tire. A processor receives the RF signals from the antenna. The processor converts the RF signals to a proprietary serial bus formatted message. The processor transmits the proprietary serial bus formatted message to an electronic control unit via a vehicle communication bus.

20 Claims, 2 Drawing Sheets

(56) References Cited

U.S. PATENT DOCUMENTS

| | | |
|---|---|---|
| 6,292,096 B1 | 9/2001 | Munch et al. |
| 6,293,096 B1 | 9/2001 | Khair et al. |
| 6,334,081 B1 | 12/2001 | Robinson et al. |
| 6,347,680 B1 | 2/2002 | Mianzo et al. |
| 6,357,839 B1 | 3/2002 | Eckert |
| 6,400,261 B1 | 6/2002 | Starkey et al. |
| 6,473,686 B2 | 10/2002 | Adachi et al. |
| 6,501,372 B2 | 12/2002 | Lin |
| 6,518,875 B2 | 2/2003 | DeZorzi |
| 6,549,972 B1 | 4/2003 | Berstis et al. |
| 6,581,449 B1 | 6/2003 | Brown et al. |
| 6,597,981 B2 | 7/2003 | Nishira et al. |
| 6,603,394 B2 | 8/2003 | Raichle et al. |
| 6,630,885 B2 | 10/2003 | Hardman et al. |
| 6,769,504 B2 | 8/2004 | Kobayashi et al. |
| 6,775,282 B1 | 8/2004 | Vakkalagadda et al. |
| 6,794,993 B1 | 9/2004 | Kessler et al. |
| 6,850,155 B1 | 2/2005 | McQuade |
| 6,885,291 B1 | 4/2005 | Pollack et al. |
| 6,888,934 B2 | 5/2005 | Bell |
| 6,899,153 B1 | 5/2005 | Pollack et al. |
| 6,906,624 B2 | 6/2005 | McClelland et al. |
| 6,972,671 B2 | 12/2005 | Normann et al. |
| 7,091,841 B2 | 8/2006 | Adamson et al. |
| 7,113,084 B2 | 9/2006 | Huang |
| 7,139,653 B2 | 11/2006 | Ringger et al. |
| 7,149,206 B2 | 12/2006 | Pruzan et al. |
| 7,161,476 B2 | 1/2007 | Hardman et al. |
| 7,162,353 B2 | 1/2007 | Minowa et al. |
| 7,253,784 B2 | 8/2007 | Shimura |
| 7,309,260 B2 | 12/2007 | Brower et al. |
| 7,348,878 B2 | 3/2008 | Fogelstrom |
| 7,375,699 B2 | 5/2008 | Forster et al. |
| 7,889,074 B2 | 2/2011 | Anderson |
| 7,890,229 B2 | 2/2011 | Huebl |
| 8,026,803 B2 | 9/2011 | Lin et al. |
| 2001/0056320 A1 | 12/2001 | Kato et al. |
| 2002/0140574 A1 | 10/2002 | Starkey et al. |
| 2003/0141130 A1* | 7/2003 | Fleming et al. ............... 180/271 |
| 2003/0197603 A1* | 10/2003 | Stewart et al. ............... 340/442 |
| 2004/0034460 A1 | 2/2004 | Folkerts et al. |
| 2004/0044448 A1 | 3/2004 | Ramaswamy et al. |
| 2004/0055370 A1 | 3/2004 | Normann et al. |
| 2004/0155763 A1 | 8/2004 | Lin et al. |
| 2004/0178897 A1 | 9/2004 | Fennel et al. |
| 2005/0001470 A1 | 1/2005 | Bale et al. |
| 2005/0001472 A1 | 1/2005 | Bale et al. |
| 2005/0002417 A1 | 1/2005 | Kelly et al. |
| 2005/0104715 A1 | 5/2005 | Farrell |
| 2006/0025897 A1* | 2/2006 | Shostak et al. ................... 701/1 |
| 2006/0168378 A1 | 7/2006 | Muth |
| 2007/0035452 A1 | 2/2007 | Lin et al. |
| 2007/0038346 A1 | 2/2007 | Ehrlich et al. |
| 2007/0046098 A1 | 3/2007 | Grolle et al. |
| 2007/0052291 A1 | 3/2007 | Eberling et al. |
| 2007/0156320 A1 | 7/2007 | Breed et al. |
| 2007/0164604 A1 | 7/2007 | Bale et al. |
| 2007/0279203 A1 | 12/2007 | Thomas et al. |
| 2007/0282514 A1 | 12/2007 | Jarrix et al. |
| 2008/0021599 A1 | 1/2008 | Bauerle et al. |
| 2008/0051962 A1 | 2/2008 | Nakai et al. |
| 2008/0191855 A1 | 8/2008 | Fink et al. |
| 2008/0246604 A1 | 10/2008 | McPherson et al. |
| 2008/0288139 A1 | 11/2008 | Bouchard et al. |
| 2008/0288150 A1 | 11/2008 | Isogai et al. |
| 2008/0319607 A1 | 12/2008 | Schindler et al. |
| 2009/0002146 A1 | 1/2009 | Lin |
| 2009/0088910 A1 | 4/2009 | Yi et al. |
| 2009/0111652 A1 | 4/2009 | Reedy et al. |
| 2009/0132138 A1 | 5/2009 | Yasuhito et al. |
| 2009/0132142 A1 | 5/2009 | Nowak et al. |
| 2009/0173314 A1 | 7/2009 | Whitney et al. |
| 2009/0182478 A1 | 7/2009 | Whitney et al. |
| 2009/0224869 A1 | 9/2009 | Baker et al. |
| 2010/0038158 A1 | 2/2010 | Whitney et al. |
| 2010/0057299 A1 | 3/2010 | Burgdorf et al. |
| 2010/0198427 A1 | 8/2010 | Fogelstrum et al. |
| 2010/0238012 A1 | 9/2010 | Duzdar et al. |
| 2010/0286855 A1 | 11/2010 | Yang |
| 2010/0305809 A1 | 12/2010 | Audisio et al. |
| 2011/0082623 A1 | 4/2011 | Lu et al. |
| 2011/0098886 A1 | 4/2011 | Deng |
| 2011/0191000 A1 | 8/2011 | Grolle |
| 2012/0176234 A1 | 7/2012 | Taneyhill et al. |
| 2012/0179350 A1 | 7/2012 | Taneyhill et al. |

OTHER PUBLICATIONS http://www.onstar.com/web/portal/diagnosticinfo (Printed Dec. 8, 2011).

Office Action from U.S. Appl. No. 13/316,047 dated May 25, 2012.

Smartire by Bendix Operators Manual BW-2799, Jun. 2010.

Driver Instructions—Collision Warning, SmartCruise, Side Object Detection, VORAD SmartCruise® System, pp. 9-11, Eaton Corporation, Feb. 2009.

Office Action for related U.S. Appl. No. 12/697,873, dated Jan. 18, 2013.

Notice of Allowance and Fees Due for counterpart U.S. Appl. No. 13/316,047, mailed Oct. 22, 2013.

International Search Report for counterpart PCT Patent Application No. PCT/US2012/068399, mailed Mar. 25, 2013.

Written Opinion for counterpart PCT Patent Application No. PCT/US2012/068399, mailed Mar. 25, 2013.

* cited by examiner

SYSTEM AND METHOD FOR MONITORING TIRE CONDITION

BACKGROUND

The present invention relates to monitoring conditions of a vehicle. It finds particular application in conjunction with monitoring tire conditions of a vehicle and will be described with particular reference thereto. It will be appreciated, however, that the invention is also amenable to other applications.

It is becoming more common in modern motor vehicles to monitor tire conditions (e.g., inflation). Maintaining the correct tire conditions helps maintain safe, efficient, and economical operation of the vehicle. Abnormal tire conditions may result in excessive tire wear, blow-outs, and poor fuel mileage.

Conventional tire condition monitoring systems typically include radio frequency (RF) sensors associated with respective tires of the vehicle. The sensors include RF transmitters that transmit intermittent signals indicating tire conditions (e.g., pressures, temperature, etc.) in the respective tires of the vehicle. One or more antennas placed throughout the vehicle receive the tire condition signals from the various transmitters. The antennas are electrically connected to a central electronic control unit (ECU) via electrical cables. The RF signals from the transmitters, which are received by the antennas, are transmitted from the antennas to the central ECU via the cable.

In order to avoid signal loss, the electrical cabling (which is independent of any on-board communication system such as a J1939 network) includes coaxial cable with relatively expensive shielding and connectors. Furthermore, a central ECU is relatively expensive since it must be able to constantly listen for radio frequency signals from the sensors (which requires relatively higher processing speed), perform control logic for pressure monitoring (which requires relatively slower processing speed), and communicate with the other vehicle systems.

The present invention provides a new and improved apparatus and method for monitoring tire conditions on a vehicle.

SUMMARY

In one aspect of the present invention, it is contemplated that an electronic device includes an antenna that receives RF signals from a sensor associated with a respective tire of the vehicle. The RF signals represent a condition of the respective tire. A processor receives the RF signals from the antenna. The processor converts the RF signals to a proprietary serial bus formatted message. The processor transmits the proprietary serial bus formatted message to an electronic control unit via a vehicle communication bus.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
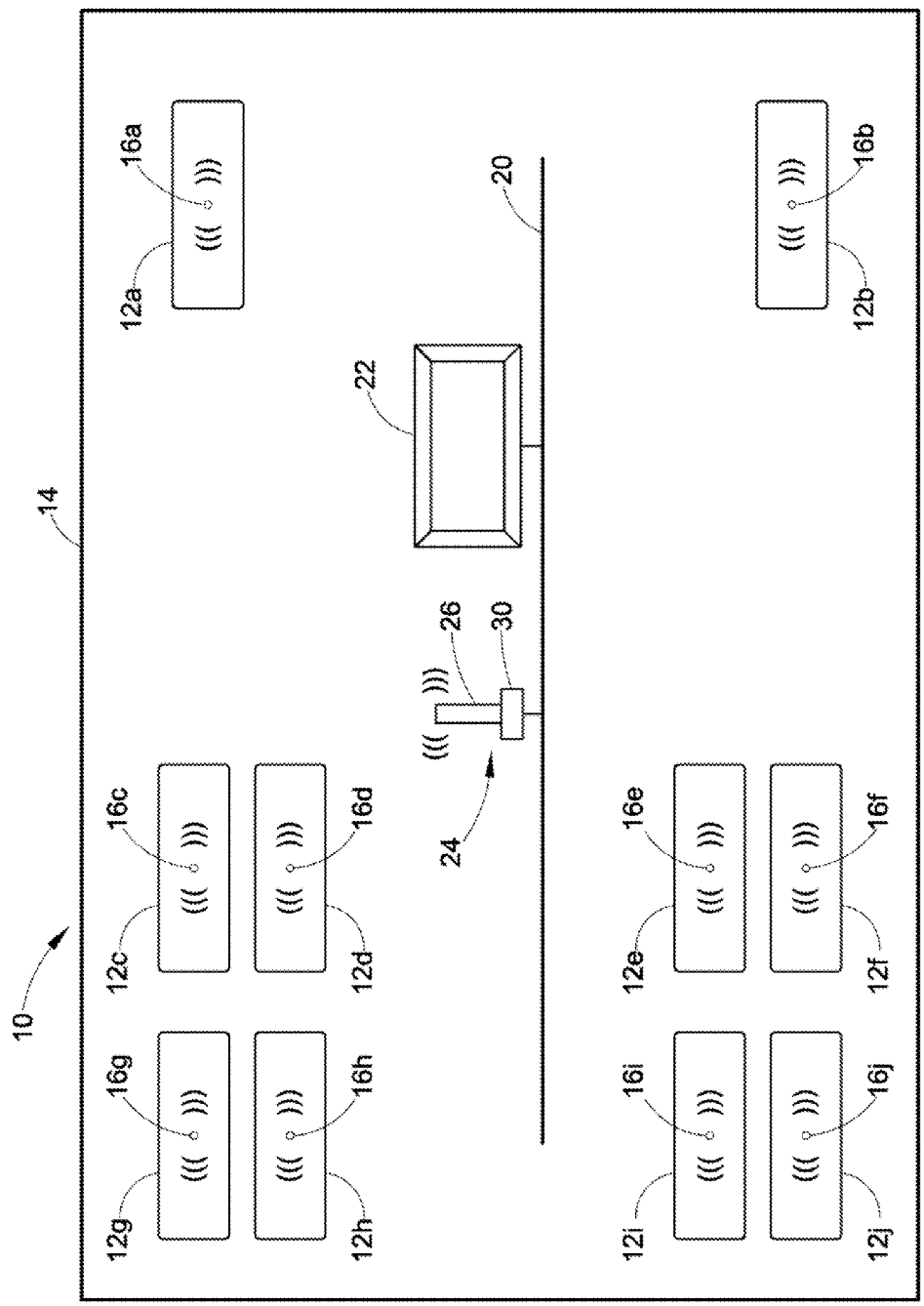
FIG. 1 illustrates a schematic representation of a vehicle including a tire condition monitoring system in accordance with one embodiment of an apparatus illustrating principles of the present invention.
Figure 2:
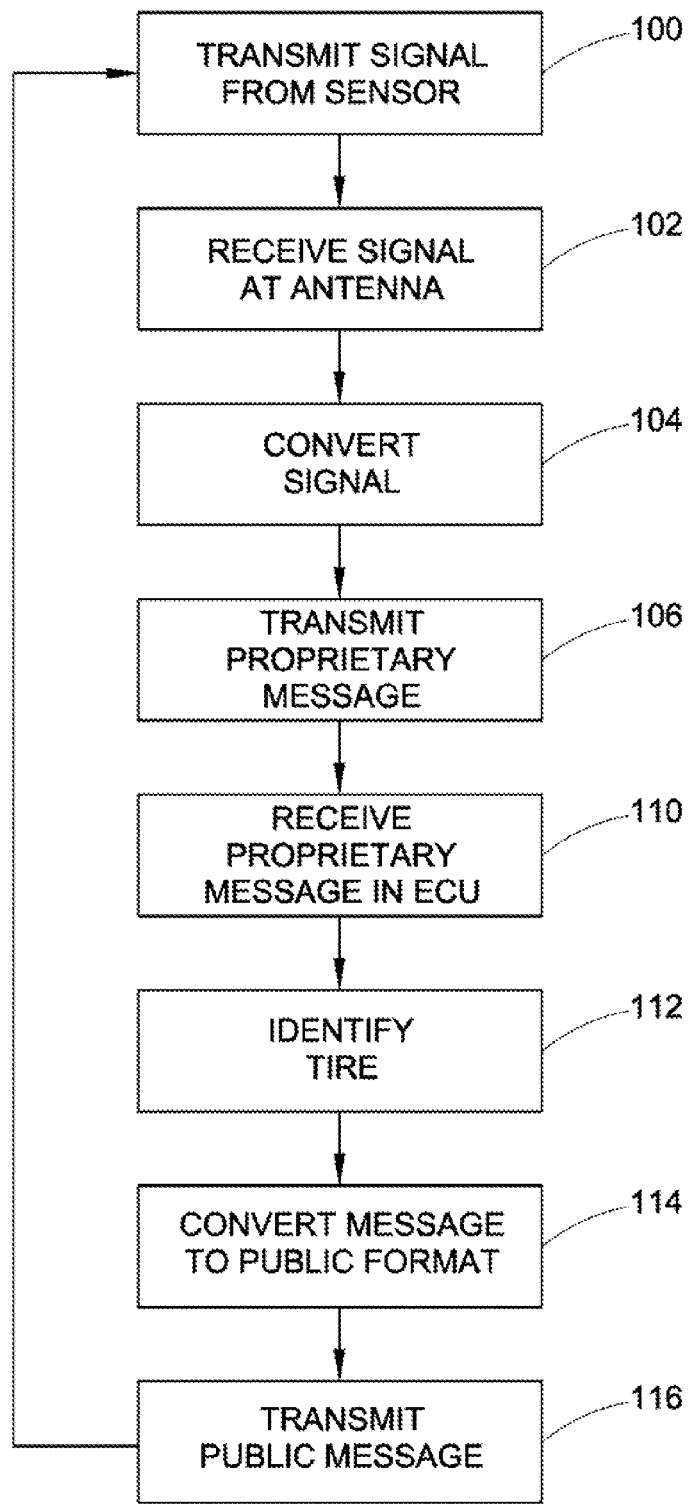
FIG. 2 is an exemplary methodology of monitoring tire conditions in a vehicle in accordance with one embodiment illustrating principles of the present invention.

With reference to FIG. 1, a simplified component diagram is illustrated, in accordance with one embodiment of the present invention, of an exemplary system 10 for monitoring various conditions (e.g., pressure, temperature, rotation/speed, vibration, wear, and/or load, etc.) of tires 12a, 12b, 12c, 12d, 12e, 12f, 12g, 12h, 12i, 12j on a vehicle 14. In one embodiment, the vehicle 14 is a heavy-vehicle (e.g., a truck or bus) and has tires inflated with a fluid (e.g., air, pure nitrogen, etc).

Sensors 16a, 16b, 16c, 16d, 16e, 16f, 16g, 16h, 16i, 16j are associated with the respective tires 12a, 12b, 12c, 12d, 12e, 12f, 12g, 12h, 12i, 12j. In one embodiment, the sensors 16a, 16b, 16c, 16d, 16e, 16f, 16g, 16h, 16i, 16j are in-tire sensors. In a step 100, it is also contemplated that one or more of the sensors 16a, 16b, 16c, 16d, 16e, 16f, 16g, 16h, 16i, 16j transmit radio-frequency (RF) signals based on (e.g., representing) at least one of the conditions of the respective tires 12a, 12b, 12c, 12d, 12e, 12f, 12g, 12h, 12i, 12j. The signals transmitted by the sensors 16a, 16b, 16c, 16d, 16e, 16f, 16g, 16h, 16i, 16j are "raw" data. In one embodiment, it is contemplated that the RF signals include a sensor identifier tag that identifies the respective sensor 16a, 16b, 16c, 16d, 16e, 16f, 16g, 16h, 16i, 16j that generated the signal, an antenna identifier tag, a pressure condition, and a temperature condition. The respective tire 12a, 12b, 12c, 12d, 12e, 12f, 12g, 12h, 12i, 12j for which the conditions (e.g., pressure and temperature) apply is determined as a function of the sensor identifier tag.

The vehicle 14 includes a vehicle communication bus 20. In one embodiment, the communication bus 20 is a standard protocol communication bus (e.g., a serial data bus such as a J1939 standards protocol communication bus). However, other types of communication buses are also contemplated.

A vehicle electronic control unit (ECU) 22 communicates with the communication bus 20. It is contemplated that the ECU 22 transmits and receives messages to/from the communication bus 20. For example, the vehicle ECU 22 transmits and receives messages formatted according to the J1939 standard protocol. In one embodiment, the vehicle ECU 22 has excess computing capacity. Since experience has shown a vehicle's antilock braking system ECU typically has excess computing capacity, it is assumed, for purposes of discussion, that the vehicle ECU 22 is an antilock braking system ECU. However, it is to be understood that any other vehicle ECU may also be used for monitoring one of more of the conditions of the tires.

An electronic component 24 also communicates with the communication bus 20. It is contemplated that the electronic component 24 transmits and receives messages to/from the communication bus 20 according to the same format (e.g., the J1939 standard protocol) as the standard protocol, but is a proprietary or "private" message. For example, the bus 20 is capable of transmitting messages formatted according to the SAE J1939 standard and, in addition, messages formatted according to other standards (e.g., proprietary standards). In one embodiment, messages formatted according to the SAE J1939 standard are "public" messages, if, for example, controllers from many different manufacturers are designed to interpret the messages. Messages formatted according to proprietary standards are referred to as "private" messages if, for example, only vehicle controllers manufactured by a particular manufacturer are designed to interpret the messages.

In the illustrated embodiment, the electronic component 24 includes an antenna 26 and a processing device 30 (e.g., a microcontroller). The processing device 30 acts as a single monitoring device, and eliminates the necessity of providing monitoring devices at each wheel end. In the illustrated embodiment, the processor 30 acts as a single conduit for the signals from any of the plurality of sensors associated with respective tires on the vehicle. Although only one (1) electronic component 24 is illustrated, additional electronic components (including respective antennas and processing devices) are contemplated in different embodiments (e.g., to accommodate longer wheel base vehicles) in which the multiple processors act as respective conduits (not merely a single conduit) for the signals from the plurality of sensors associated with respective tires on the vehicle. In a step 102, the antenna 26 receives the RF signals transmitted from one or more of the sensors 16a, 16b, 16c, 16d, 16e, 16f, 16g, 16h, 16i, 16j. In the illustrated embodiment, the signals are transmitted wirelessly as RF signals from the sensors 16a, 16b, 16c, 16d, 16e, 16f, 16g, 16h, 16i, 16j to the antenna 26 (which reduces the necessity of cabling between the sensors and the antenna). However, it is to be understood that other embodiments, in which the signals are transmitted from the sensors 16a, 16b, 16c, 16d, 16e, 16f, 16g, 16h, 16i, 16j to the antenna 26 via an electrical connection (e.g., a wire), are also contemplated. As discussed above, the RF signals received by the antenna 26 are based on the pressures, temperatures, and/or other various conditions of the respective tires 12a, 12b, 12c, 12d, 12e, 12f, 12g, 12h, 12i, 12j.

The RF signals are transmitted from the antenna 26 to the processing device 30 of the electronic component 24. The processing device 30 may be configured to always be "listening" for signals from the antenna 26. In one embodiment, it is contemplated that the processing device 30 is powered by the vehicle battery voltage. The processing device 30 requires significantly less power than the ECU 22 and will limit drain on the vehicle battery. In this case, the processing device 30 may be listening for signals even when the vehicle's engine is not running. Then, once the ignition is turned-on, the processing device 30 may transmit the data to the ECU 22, as discussed in more detail below. Such a design allows for a warning of out-of-range tire pressure shortly after the vehicle 14 is started. In another embodiment, the processing device 30 may be powered directly from a central computer or from the ECU 22. This design allows for low voltage power to be applied to the processing device 30. In addition, this design may provide for lower costs since there is reduced circuit protection and less complexity. However, the processing device 30 may not be able to receive signals when the vehicle ignition is off.

The processing device 30 converts the RF signals, which represent the "raw" data based on the tire conditions, to a respective message formatted for the communication bus 20 in a step 104. In one embodiment, the identifier tag information and/or a sensor identification code is/are embedded in the message along with the tire condition information from the respective sensor 16a, 16b, 16c, 16d, 16e, 16f, 16g, 16h, 16i, 16j that transmitted the signal. In an alternate embodiment including multiple electronic components 24, the sensor identification code uniquely identifies the respective antenna (and sensor) that sent the message. As discussed above, it is contemplated that the message is a "private" message formatted according to the J1939 standard protocol. In a step 106, the processing device 30 transmits the message to the communication bus 20. In one embodiment, the processing device 30 transmits the message to the vehicle ECU 22 via the communication bus 20.

Upon receiving one of the messages, in a step 110, from the processing device 30, the vehicle ECU 22 analyzes the message and, in a step 112, determines, based on the identifier tag information in the message, which one of the tires 12a, 12b, 12c, 12d, 12e, 12f, 12g, 12h, 12i, 12j the condition information relates to. For example, the vehicle ECU 22 determines, based on the identifier tag information in the message, which one of the sensors 16a, 16b, 16c, 16d, 16e, 16f, 16g, 16h, 16i, 16j transmitted the message. In a step 114, the vehicle ECU 22 converts the proprietary message to a J1939 public format. The public message is transmitted, in a step 116, from the ECU 22 to the bus 20.

In one embodiment, the vehicle ECU 22 transmits the public message, in the step 116, with pressure identified in kilopascals and temperature identified in Celsius along with the appropriate location identifiers so that the message may be interpreted by other systems on the vehicle 14. The process then returns to the step 100. For example, if the pressure in the respective tire 12a, 12b, 12c, 12d, 12e, 12f, 12g, 12h, 12i, 12j is below the predetermined range, the message transmitted to vehicle communication bus 20 by the other systems on the vehicle 14 may alert an operator of the vehicle 14 of the low pressure condition. On the other hand, if the pressure in the respective tire 12a, 12b, 12c, 12d, 12e, 12f, 12g, 12h, 12i, 12j is above the predetermined range, the message transmitted to vehicle communication bus 20 by the vehicle ECU 22 may activate a tire deflation system for decreasing the pressure of the tire 12a, 12b, 12c, 12d, 12e, 12f, 12g, 12h, 12i, 12j and/or cause another vehicle system to alert an operator of the vehicle 14 of the high pressure condition. The alert given to the vehicle operator may be an audible sound (e.g., a buzzer) or a visual display (e.g., a dashboard light that is illuminated). Otherwise, if the condition(s) of the respective tire 12a, 12b, 12c, 12d, 12e, 12f, 12g, 12h, 12i, 12j is/are within the predetermined range, the vehicle ECU 22 still puts the current condition information on the bus in the J1939 public message format so that the condition information is readable by other vehicle systems, and then returns to the step 100.

It is contemplated that the sensors 16a, 16b, 16c, 16d, 16e, 16f, 16g, 16h, 16i, 16j transmit the signals, based on the respective tire 12a, 12b, 12c, 12d, 12e, 12f, 12g, 12h, 12i, 12j conditions, at relatively infrequent intervals. For example, in one embodiment, the sensors transmit the respective signals between about every 1 minute and about every 15 minutes (e.g., between about every 3 minutes and about every 5 minutes). Such infrequent transmissions provide the processing device 30 the time required for converting the RF signals to the J1939 messages and transmitting those messages along the relatively slower serial communication bus 20. Therefore, neither the bus 20 nor the vehicle ECU 22 is overwhelmed by messages from the sensors 16a, 16b, 16c, 16d, 16e, 16f, 16g, 16h, 16i, 16j (other RF applications typically are constantly transmitting information to the bus 20). Sufficient time would not be available to the processing device 30 for performing the conversions if the sensors were transmitting the data signals increased frequencies. In addition, the relatively infrequent transmissions help to limit the amount of data transmitted between the sensors 16a, 16b, 16c, 16d, 16e, 16f, 16g, 16h, 16i, 16j and the vehicle ECU 22 via the vehicle communication bus 20. The relatively reduced amount of data transmissions on the vehicle communication bus 20 from the sensors relatively increases the capacity of the communication bus 20 for other messages to/from the ECU 22 and other electronic control units on the vehicle 14.

In one embodiment, it is contemplated that the vehicle ECU 22 transmits one or more control messages to the processing device 30 of the electronic component 24. For example, if the vehicle ECU 22 has not received a message from one of the sensors 16a, 16b, 16c, 16d, 16e, 16f, 16g, 16h, 16i, 16j within a predetermined time period, ECU 22 may transmit a status request message to the respective sensor, via the communication bus 20 and the processing device 30, to request a status of the sensor. In this case, the processing device 30 converts the status request message to, for example, an RF signal, which is then transmitted to the respective sensor 16a, 16b, 16c, 16d, 16e, 16f, 16g, 16h, 16i, 16j via the antenna 26. If the ECU 22 does not receive a status message from the sensor within a predetermined response period, the ECU 22 may set a fault indicating a status of the sensor (e.g., that the respective sensor is malfunctioning). In addition, the ECU 22 may alert the vehicle operator of the sensor's status via an audible sound (e.g., a buzzer) or a visual display (e.g., a dashboard light that is illuminated).

In another embodiment, it is contemplated that the vehicle ECU 22 may monitor tire trend data. Such data may be analyzed for improving vehicle performance.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An electronic device in a vehicle tire condition monitor system, the electronic device comprising:
   an antenna receiving respective RF signals from a plurality of sensors associated with respective tires of the vehicle, each of the respective RF signals representing a condition of the respective tire and including identifying information of the respective tire; and
   a processor receiving the RF signals from the antenna, converting the RF signals to a proprietary serial bus formatted message, and transmitting the proprietary serial bus formatted message to an electronic, control unit via a vehicle communication bus, the processor acting as a single conduit for the condition signals from any of the plurality of sensors associated with respective tires on the vehicle, and if the electronic control unit does not receive a proprietary message from the processor within a predetermined response period, the electronic control unit alerts an operator of the vehicle of a status of the respective sensor.

2. The electronic device, as set forth in claim 1, wherein:
   the processor converts the RF signals to the proprietary serial bus formatted message that is transmitted to an antilock brake system electronic control unit via the vehicle communication bus.

3. The electronic device, as set forth in claim 1, wherein:
   the processor receives a control message from the electronic control unit via the vehicle communication bus.

4. The electronic device, as set forth in claim 3, wherein:
   the control message requests a status message from the sensor via the processor.

5. The electronic device, as set forth in claim 1, wherein:
   the RF signals include an identifier tag identifying the sensor; and
   the processor includes the identifier tag in the respective serial bus formatted message.

6. The electronic device, as set forth in claim 1, wherein:
   the formatted message transmitted to the electronic control unit identifies an inflation pressure of the respective tire.

7. The electronic device, as set forth in claim 1, wherein:
   the formatted message transmitted to the electronic control unit identifies a temperature of the respective tire.

8. The electronic device, as set forth in claim 1, wherein:
   the antenna receives the respective RF signals wirelessly from each of the plurality of sensors associated with the respective tires of the vehicle.

9. The electronic device, as set forth in claim 1, wherein:
   the electronic control unit monitors the condition of the respective tire and also performs an additional function on the vehicle.

10. A system for monitoring a condition in vehicle tires, the system comprising:
    a vehicle communication bus;
    an electronic control unit communicating with the vehicle communication bus;
    a plurality of tires on the vehicle;
    a plurality of sensors associated with the respective tires, the sensors transmitting respective RF signals based on respective conditions of the respective tires and including identifying information of the respective tires; and
    an electronic component communicating, with the vehicle communication bus, the electronic component including:
      an antenna receiving the respective RF signals from the plurality of sensors associated with a respective tires of the vehicle, each of the respective RF signals representing respective conditions of the tires; and
      a processor receiving; the RF signals from the antenna and transmitting a proprietary message, based on the signals, to the electronic control unit via the vehicle communication bus, the processor acting as a single conduit for the signals from any of a plurality of sensors associated with respective tires on the vehicle, and if the electronic control unit does not receive a proprietary message from the processor within a predetermined response period, the electronic control unit alerts an operator of the vehicle of a status of the respective sensor.

11. The system as set forth in claim 10, wherein:
    the vehicle communication bus is a J1939 communication bus;
    the messages are formatted for the J1939 communication bus.

12. The system as set forth in claim 10, wherein:
    the electronic control unit determines if the pressures in the respective tires is within a predetermined range.

13. The system as set forth in claim 12, wherein:
    the electronic control unit is an anti lock braking system electronic control unit.

14. The system as set forth in claim 10, wherein:
    the electronic control unit converts the RF signals to a J1939 protocol formatted public message.

15. The system as set forth in claim 10, further including:
    a second antenna receiving second RF signals from a second sensor associated with a respective second tire of the vehicle, the second RF signals representing a condition of the second respective tire; and a second processor receiving the second RF signals from the second antenna and transmitting a second proprietary message to the electronic control unit via the vehicle communication bus.

16. A method of monitoring conditions of tires on a vehicle, the method comprising:
transmitting respective RF signals from a plurality of sensors associated with respective tires of the vehicle, each of the respective the RF signals being based on the condition and including identifying information of the associated tire;
receiving, the plurality of respective RF signals from the sensors at an antenna;
converting the RF signals, in a processor communicating with the antenna, to a proprietary serial bus formatted message;
transmitting the proprietary serial bus formatted message from the processor to an electronic control unit via a vehicle communication bus, the processor acting as a single conduit for the signals from any of the plurality of sensors associated with respective tires on the vehicle; and
if the electronic control unit does not receive the proprietary serial bus formatted message from the processor within a predetermined response period, alerting an operator of the vehicle of a status of the respective sensor.

17. The method of monitoring conditions of tires on a vehicle as set forth in claim 16, wherein the step of transmitting the RF signal includes:
basing the RF signal on the condition of the associated tire and a temperature of the associated tire.

18. The method of monitoring conditions of tires on a vehicle as set forth in claim 16, wherein the step of transmitting the proprietary serial bus formatted message includes:
transmitting the proprietary serial bus formatted message to an antilock brake system electronic control unit via the vehicle communication bus.

19. The method of monitoring conditions of tires on a vehicle as set forth in claim 16, further including:
receiving a control message in the processor from the electronic control unit.

20. The method of monitoring conditions of in tires on a vehicle as set forth in claim 19, further including:
in response to the control message, requesting a status of the sensor.

* * * * *